United States Patent
Shang et al.

(10) Patent No.: US 9,984,090 B1
(45) Date of Patent: May 29, 2018

(54) METHOD AND SYSTEM FOR COMPRESSING FILE SYSTEM NAMESPACE OF A STORAGE SYSTEM

(71) Applicant: EMC Corporation, Hopkinton, MA (US)

(72) Inventors: Pengju Shang, Sunnyvale, CA (US); Pranay Singh, Cupertino, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 474 days.

(21) Appl. No.: 14/208,045

(22) Filed: Mar. 13, 2014

(51) Int. Cl.
  *G06F 17/30* (2006.01)
  *G06F 7/00* (2006.01)

(52) U.S. Cl.
  CPC .. *G06F 17/30153* (2013.01); *G06F 17/30961* (2013.01)

(58) Field of Classification Search
  CPC ......... G06F 17/30067; G06F 17/30595; G06F 17/30961; H03M 7/30; H03M 7/3084
  USPC .................................................. 707/693
  See application file for complete search history.

(56) References Cited

U.S. PATENT DOCUMENTS

| | | | | |
|---|---|---|---|---|
| 7,542,983 B1* | 6/2009 | Bruso | ............... | G06F 17/30327 |
| 7,571,156 B1* | 8/2009 | Gupta | ..................... | H04L 45/00 |
| 2013/0179473 A1* | 7/2013 | Heman | ............. | G06F 17/30345 |
| | | | | 707/797 |
| 2013/0204902 A1* | 8/2013 | Wang | ................ | G06F 17/30327 |
| | | | | 707/797 |
| 2014/0281360 A1* | 9/2014 | Danilak | ............ | G06F 17/30292 |
| | | | | 711/206 |
| 2014/0324925 A1* | 10/2014 | Krishnamurthy . | | G06F 17/30117 |
| | | | | 707/822 |

* cited by examiner

*Primary Examiner* — Usmaan Saeed
*Assistant Examiner* — Raquel Perez-Arroyo
(74) *Attorney, Agent, or Firm* — Womble Bond Dickinson (US) LLP

(57) ABSTRACT

A computer-implemented method is implemented to compress a file system namespace. The method starts with determining that a first leaf page of a hierarchical data structure of a storage system is sparse. The hierarchical data structure contains root node layer, intermediate node layer, and leaf page layer, where each leaf page contains namespace entries corresponding to a file or a directory of a file system, and where being sparse means a first size of the entries of the first leaf page is less than a first percentage. The method continues with identifying a second immediate adjacent leaf page as a merging candidate. The method continues with merging the second leaf page into the first leaf page upon determining that a second size of combined entries of the first and second leaf pages is less than a second percentage larger than the first percentage.

19 Claims, 10 Drawing Sheets

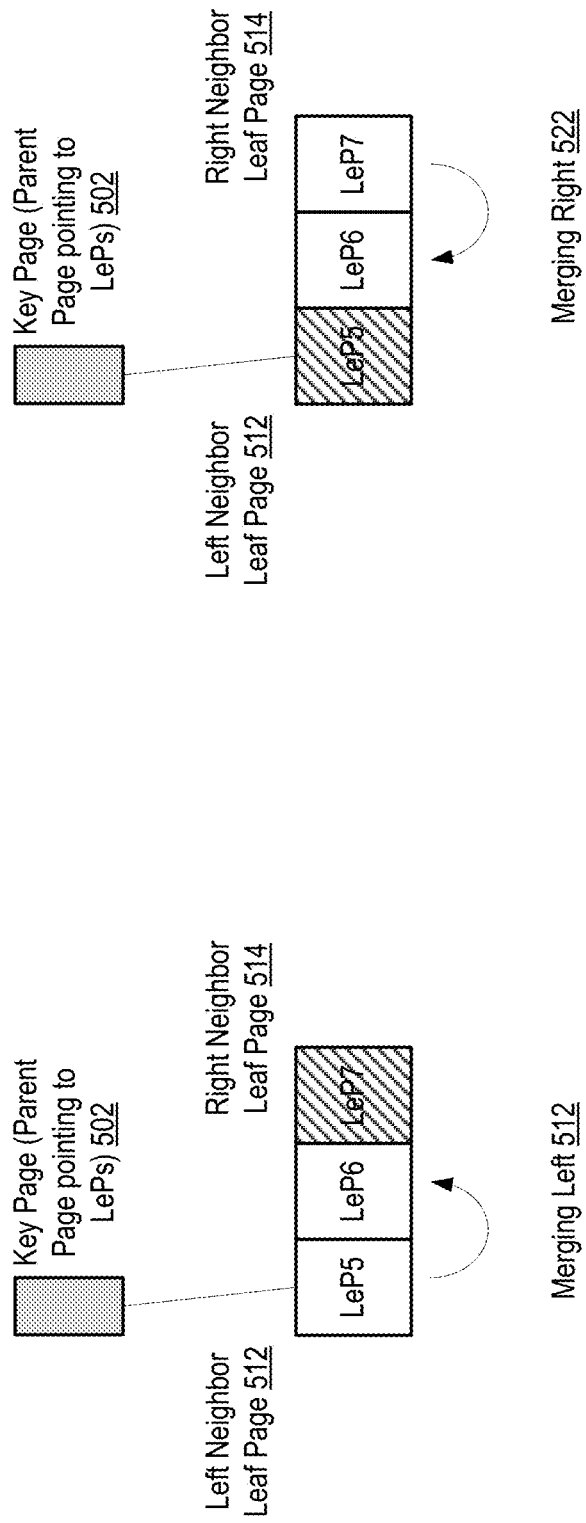

| Sparse List 102 | | |
|---|---|---|
| Index | Parent Page Number | Leaf Page Number |
| 1 | 15 | 123 |
| 2 | 15 | 137 |
| 3 | 16 | 147 |
| ... | ... | ... |

FIG. 8

METHOD AND SYSTEM FOR COMPRESSING FILE SYSTEM NAMESPACE OF A STORAGE SYSTEM

FIELD OF THE INVENTION

Embodiments of the present invention relate generally to storage systems. More particularly, embodiments of the invention relate to compressing a file system namespace of a storage system.

BACKGROUND

Data storage is a critical component for computing. In a computing device, there is a storage area in the system to store data for access by the operating system and applications. In a distributed environment, additional data storage may be a separate device that the computing device has access to for regular operations. These data storages are generally referred to storage systems.

In a storage system, a file system namespace indicates the way files and directories are identified and organized in the storage system. The file system namespace may take any of a variety of different forms. In one embodiment it contains file names, directory names, and the attributes and hierarchy of the files and directories.

When files and directories are added and deleted from the storage system, the file system namespace will be updated. The update causes information in the namespace not evenly distributed, and continuous update makes the namespace being stored inefficiently and wasting storage space.

BRIEF DESCRIPTION OF THE DRAWINGS

Embodiments of the invention are illustrated by way of example and not limitation in the figures of the accompanying drawings in which like references indicate similar elements.

FIGS. 5A-B illustrate leaf page merging of a hierarchical data structure according to one embodiment of the invention.

FIG. 8 illustrates a sparse list according to one embodiment of the invention.

DETAILED DESCRIPTION

Figure 1:
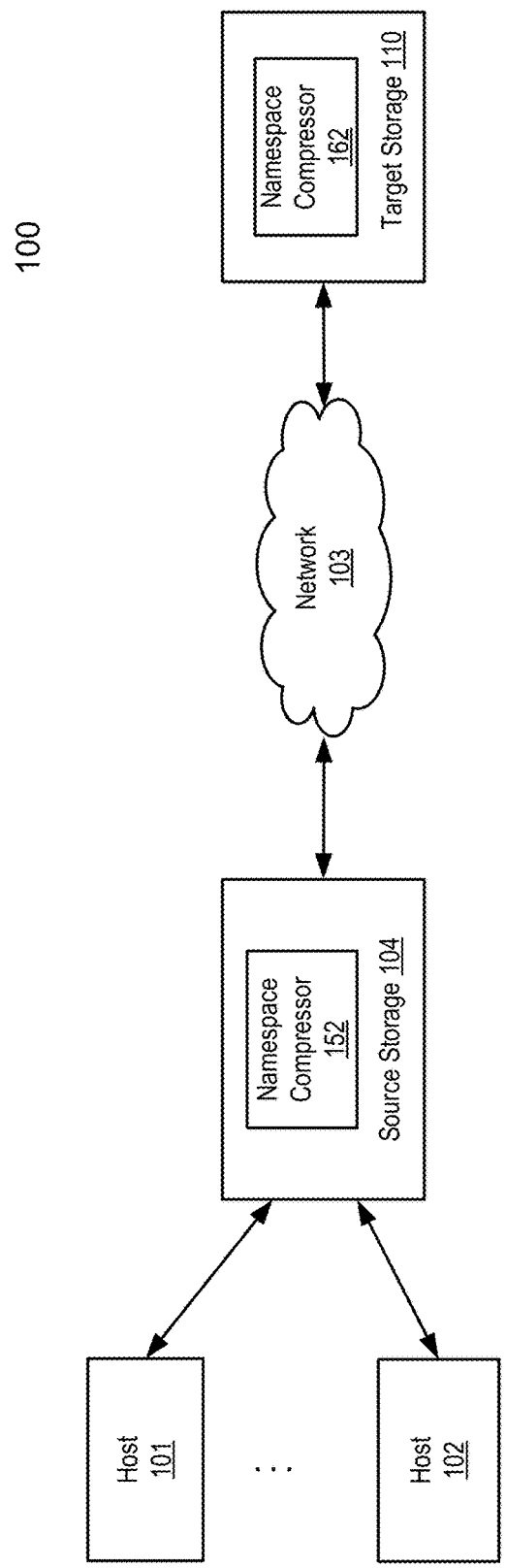
FIG. 1 is a block diagram illustrating a system in which file system namespace compression is performed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a computer-implemented method is implemented to compress a file system namespace. The method starts with determining that a first leaf page of a hierarchical data structure is sparse at a storage system. The hierarchical data structure contains a layer of one or more root nodes, a layer of one or more intermediate nodes, and a layer of a plurality of leaf pages, where each leaf page contains one or more entries and each entry is a namespace entry corresponding to a file or a directory of a file system of the storage system, and where being sparse means a first size of the entries of the first leaf page is less than a first percentage of a predetermined size. The method continues with identifying a second leaf page from the plurality of leaf pages as a merging candidate, where the second leaf page is an immediate adjacent leaf page of the first leaf page. The method then continues with merging the second leaf page into the first leaf page upon determining that a second size of combined entries of the first leaf page and the second leaf page is less than a second percentage of the predetermined size, wherein the second percentage is larger than the first percentage.

According to some embodiment, a storage system implementing file system namespace compression is disclosed. The storage system contains a memory configured to store data and instructions, and a processor configured to execute a namespace compressor stored in the memory. The namespace compressor is configured to determine that a first leaf page of a hierarchical data structure is sparse. The hierarchical data structure contains a layer of one or more root nodes, a layer of one or more intermediate nodes, and a layer of a plurality of leaf pages, where each leaf page contains one or more entries and each entry is a namespace entry corresponding to a file or a directory of a file system of the storage system, and where being sparse means a first size of the entries of the first leaf page is less than a first percentage of a predetermined size. The namespace compressor is further configured to identify second leaf page from the plurality of leaf pages as a merging candidate, wherein the second leaf page is an immediate adjacent leaf page of the first leaf page. The namespace compressor is then configured to merge the second leaf page into the first leaf page upon determining that a second size of combined entries of the first leaf page and the second leaf page is less than a second percentage of the predetermined size, wherein the second percentage is larger than the first percentage.

According to some embodiment, a non-transitory computer-readable medium for compressing file system namespace is disclosed. The non-transitory computer-readable medium having instructions stored therein, which when executed by a processor, cause the processor to perform operations. The operations comprises determining that a first leaf page of a hierarchical data structure is sparse. The hierarchical data structure contains a layer of one or more root nodes, a layer of one or more intermediate nodes, and a layer of a plurality of leaf pages, where each leaf page contains one or more entries and each entry is a namespace entry corresponding to a file or a directory of a file system of a storage system, and where being sparse means a first size of the entries of the first leaf page is less than a first percentage of a predetermined size. The operations further comprises identifying a second leaf page from the plurality of leaf pages as a merging candidate, where the second leaf page is an immediate adjacent leaf page of the first leaf page. The operation further comprises merging the second leaf page into the first leaf page upon determining that a second size of combined entries of the first leaf page and the second leaf page is less than a second percentage of the predetermined size, where the second percentage is larger than the first percentage.

FIG. 1 is a block diagram illustrating a system in which file system namespace compression is performed according to one embodiment of the invention. Referring to FIG. 1, system 100 includes, but is not limited to, one or more hosts 101-102 communicatively coupled to source storage system 104 and target storage system 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication performance characteristics even when they have similar architecture. Source storage system 104 is implemented as part of an archive and/or backup storage system such as a deduplicated storage system available from EMC® Corporation of Hopkinton, Mass. Target storage system 110 may also be implemented as a deduplicated storage system in some embodiments.

Source storages 104 and target storage 110 contain namespace compressors 152 and 162 respectively. Each namespace compressor is configured to perform file system namespace compression at the respective storage system. The file system namespace compression disclosed in embodiments of the invention can be applied to storage systems such as a source storage system, a target storage system, or a backup storage system.

Figure 2:
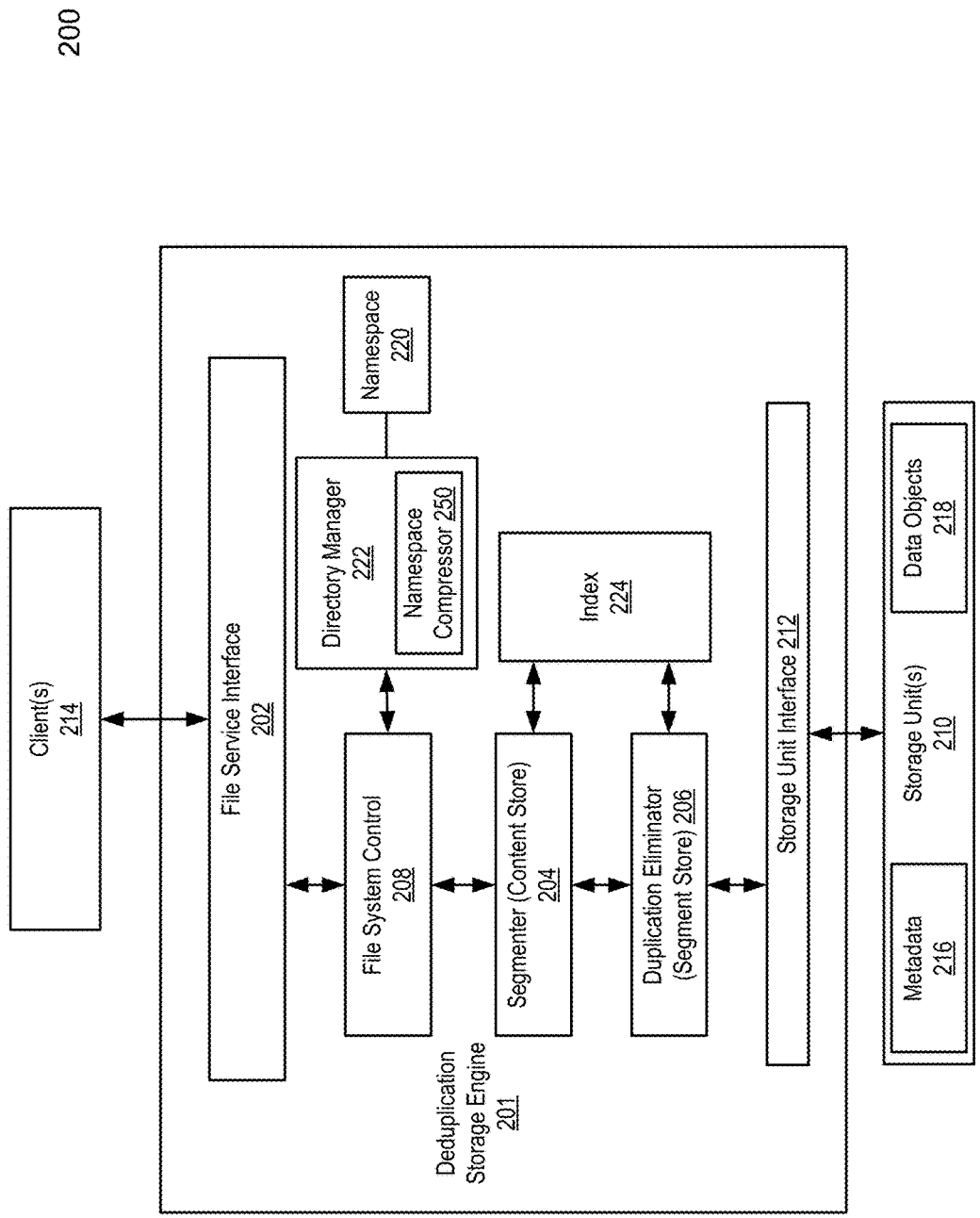
FIG. 2 is a block diagram illustrating a deduplicated source storage system according to one embodiment of the invention.

FIG. 2 is a block diagram illustrating a deduplicated source storage system according to one embodiment of the invention. The deduplicated source storage system 200 may be a detail implementation of deduplicated source storage system 104 or target storage system 110 illustrated in FIG. 1.

The deduplicated source storage system 200 interfaces one or more clients 214 with one or more storage units 210 storing metadata 216 and data objects 218. Clients 214 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units (sometimes referred to as storage devices) 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while the another one of storage units 210 operates as a target storage unit to periodically archive data from the active storage unit according to an archiving policy or scheme. Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints contained within data objects 218, where a data object represents containers, which contains one or more compression regions (CRs) of one or more data chunks, CRs, or data chunks. Each data chunk is a fragment of data block and data chunks are processed and stored in the deduplicated storage system. Fingerprints are mapped to a particular data object via metadata 216, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the chunks associated with the file name are stored, reconstruction information for the file using the chunks, and any other appropriate metadata information. Metadata 216 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 201 includes file service interface 202, segmenter 204, duplicate eliminator 206, file system control 208, and storage unit interface 212. Deduplication storage engine 201 receives a file or files (or data item(s)) via file service interface 202, which may be part of a file system namespace 220 of a file system associated with the deduplication storage engine 201. The file system namespace 220 is managed by directory manager 222, which contains namespace compressor 250 explained in more details herein below. File service interface 202 supports a variety of protocols, including a network file system (NFS), a common Internet file system (CIFS), and a virtual tape library interface (VTL), etc.

The file(s) is/are processed by segmenter 204 and file system control 208. Segmenter 204, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 208, also referred to as a file system manager, processes information to indicate the chunk(s) association with a file. In some embodiments, a list of fingerprints is used to indicate chunk(s) associated with a file. File system control 208 passes chunk association information (e.g., representative data such as a fingerprint) to index 224. Index 224 is used to locate stored chunks in storage units 210 via storage unit interface 212. Duplicate eliminator 206, also referred to as a segment store, identifies whether a newly received chunk has already been stored in storage units 210. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 210 that make up the file. Chunks are then packed by a container manager (which may be implemented as part of storage unit interface 212) into one or more storage containers stored in storage units 210. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 202 is configured to communicate with file system control 208 to identify appropriate chunks stored in storage units 210 via storage unit interface 212. Storage unit interface 212 may be implemented as part of a container manager. File system control 208 communicates (e.g., via segmenter 204) with index 224 to locate appropriate chunks stored in storage units via storage unit interface 212. Appropriate chunks are retrieved from the associated containers via the container manager and are used to construct the requested file. The file is provided via interface 202 in response to the request. In one embodiment, file system control 208 utilizes a chunk tree (e.g., a segment/chunk tree obtained from namespace 220) of content-based identifiers (e.g., fingerprints) to associate a file with data segments/chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 201 may be implemented in software (e.g., executable code executed in a memory by a processor), hardware (e.g., processor(s)), or a combination thereof. For example, deduplication engine 201 may be implemented in a form of executable instructions that can be stored in a non-transitory machine-readable storage medium, where the instructions can be executed in a memory by a processor.

In one embodiment, storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 3A:
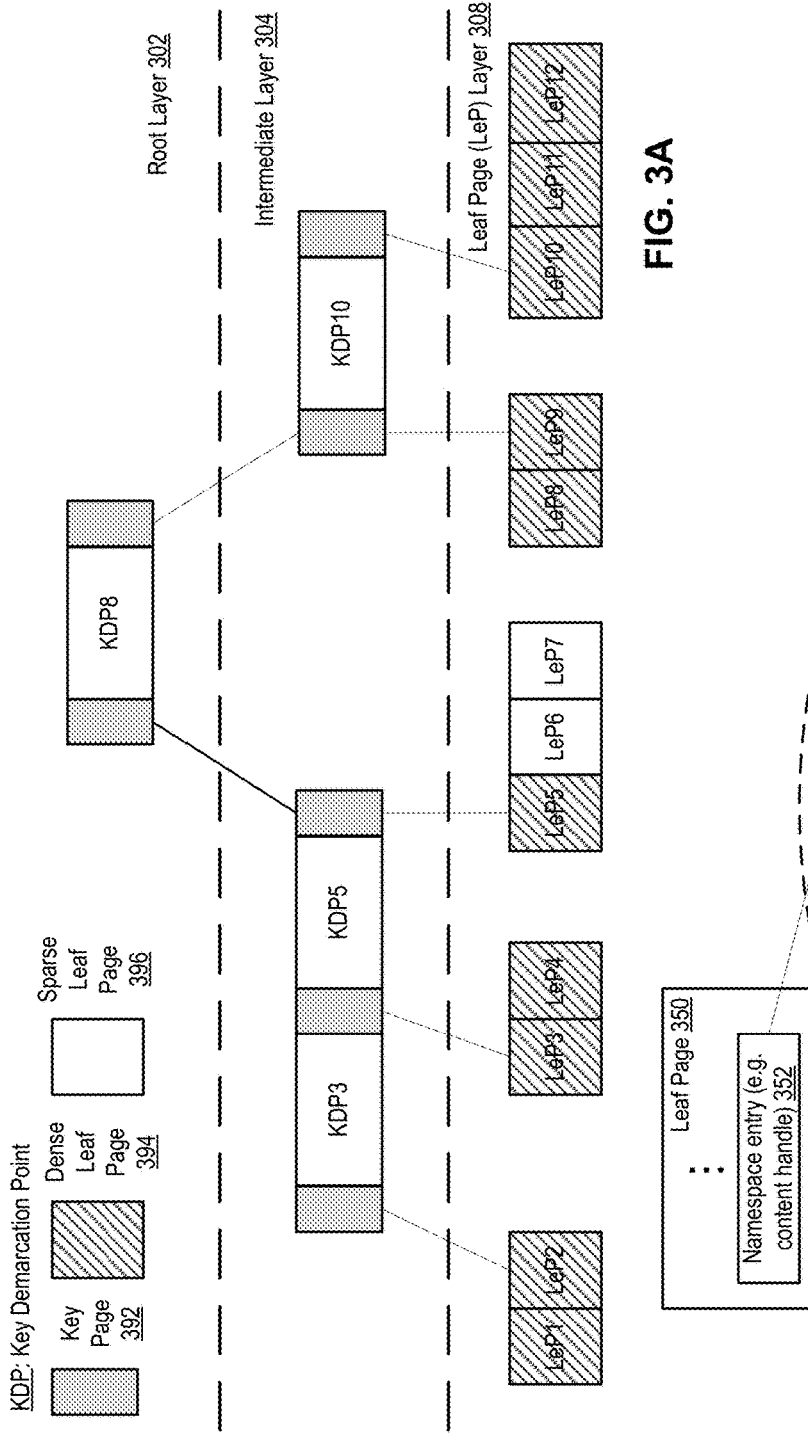
FIG. 3A illustrates a hierarchical data structure of a namespace of a file system according one embodiment of the invention.

Namespace 220 is managed by directory manager 220, and it is generally organized as a hierarchical data structure. FIG. 3A illustrates a hierarchical data structure of a namespace of a file system according one embodiment of the invention. The hierarchical layer contains a root layer 302, an intermediate layer 304, and a leaf page layer 308. Each layer contains one or more nodes, referred to as root nodes, intermediate nodes, and leaf pages respectively. While only one intermediate layer is illustrated in the figure, it is to be understood that the hierarchical data structure may contain multiple intermediate layers. In one embodiment, the hierarchical data structure is a B+ tree ("B" stands for Bayer, which was to honor the inventor Rudolf Bayer), although the principal disclosed in the embodiments of the invention may apply to other hierarchical data structure.

When the hierarchical data structure is a B+ tree, the intermediate nodes are referred to as internal nodes. The B+ tree stores namespace data at leaf pages. Root nodes and intermediate nodes contain key pages separated by key demarcation points. Each key page contains key entries represented by <key, data> pairs. The key of a <key, data> pair of the root node and internal node is formed by a computation including a parent inode (index node) and a child inode, and the data of the <key, data> pair of the root node and internal node points to a page of a lower level.

Within each key page, the key entries are sorted in order. The sorting may be performed through hash of the keys (e.g., producing 64 bits look_up keys for each of the <key, data> pairs). Through sorting, the keys with the same parent inode are stored together in a key page. Each key page and leaf page are limited in size, thus key pages are separated by key demarcation points (KDPs), which indicates that all the keys with values less than the KDPs are stored at one side of the KDPs, and all the keys with value larger than the KDPs are stored at the other side of the KDPs. For each root node and internal node, there are n+1 key pages if there are n KDPs. KDPs may represent valid key value themselves.

At each leaf page, the <key, data> pair contains the key points to data, which points to a file or a directory of a file system of the storage system. For each file and directory, there are several keys contained in the B+ tree leaf page. One is inode key (also known as a child key) that has the inode as the data for the key. The inodes represent file system objects, such as files and directories of a file system of the storage system. Another is name key that has the file name as the data. Yet another is name hash key that has the hash value of the name as the data. The <key, data> pairs at the leaf page are generally referred to as the namespace entries.

Figure 3B:
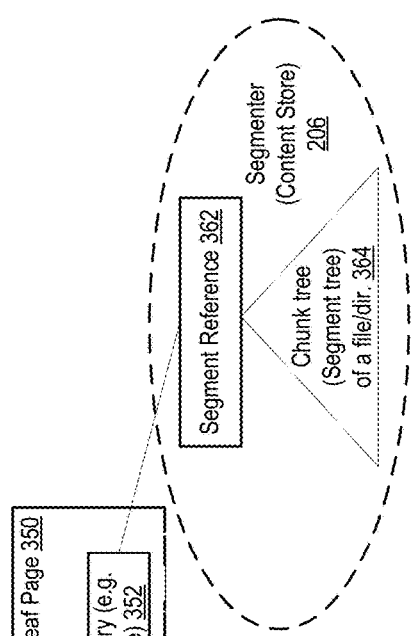
FIG. 3B illustrates a namespace corresponding to data segments of a file system of a storage system according one embodiment of the invention.

FIG. 3B illustrates a namespace corresponding to data segments of a file system of a storage system according one embodiment of the invention. Namespace entries of the hierarchical data structure of a namespace correspond to file systems of a storage system. Leaf page 350 is illustrated as an example. Leaf page 350 contains a number of namespace entries such as namespace entry 352, each contains data corresponding to a file or directory of a file system. For example, the data may be a content handle. A content handle can uniquely identify a file or a directory in the file system. Content handle may contain inode, parent inode, namespace identifier, and other information.

The content handle points to a segment reference 362, which corresponds to a segment tree of a file/directory 364. The segment reference 362 and chunk tree (also known as segment tree) 364 are within segmenter (also known as content store) 206, which has been discussed herein above. Chunk tree 364 contains chunks mapping to data segments of the file/directory. Thus, the hierarchical data structure of a namespace (stored in namespace 220 and interacting with directory manger 222 of FIG. 2) is different from the chunk tree 364 (stored in segmenter 204 and interacting with file system control 208 of FIG. 2), even though both are hierarchical data structures.

In a file system of a deduplicated storage system, a file may be represented in a tree having one or more levels of segments in a multi-level hierarchy. In one embodiment, there are seven levels L0 to L6, where L6 is the root level, also referred to as a top parent level representing one or more content handles. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when accessing a file, a directory manager traverses the namespace represented by the hierarchical data structure described above until it reaches the leaf pages of the hierarchical data structure to obtain a content handle of the file. A container manager or content store manager (not shown) traverses the segment tree associated with the content handle identified by the directory manager, starting from the root level to leaf nodes. For example, the container manager obtains the fingerprints of the root level segments, in this example, L6 segments, as part of content handles. Based on the fingerprints of the current level segments, the container manager, which may be part of a content store manager, can identify which of the containers in which the segments are stored based on indexing information from the index (not shown). The index may be maintained in the system memory (e.g., volatile memory) and/or in a storage device (e.g., non-volatile memory). The index includes information mapping a fingerprint to a storage location that stores a segment represented by the fingerprint. In one embodiment, the index may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on, until it reaches the leaf nodes representing the actual deduplicated segments. Throughout this application, for the purpose of illustration, a container contains one or more compression regions and each compression region contains one or more segments therein. However, the techniques may also be applied to other storage layouts.

Referring back to FIG. 3A, each leaf page contains namespace entries. Each leaf page is limited in size. In one embodiment, each leaf page is 64 kilo bytes (KB). Similar to key pages, the leaf pages are also sorted in order and the namespace entries within a leaf page are also sorted in order. The sorting may be performed through hash of the keys (e.g., producing 64 bits look_up keys for each of the <key, data> pairs). Through sorting, the namespace entries with the same parent inode are stored together. Thus, the leaf pages 1 and 2 (denoted as LeP1 and LeP2 respectively) contain namespace entries pointed to from the same key page (the key page at the left of KDP3), and the namespace entries within LeP1 are all in orders higher than the namespace entries within LeP2. Similarly, the leaf pages 3 and 4 (denoted as LeP3 and LeP4 respectively) contain namespace entries pointed to from the same key page (the key page at the right of KDP3 and the left of KDP5), and the namespace entries within LeP3 are all in orders higher than the namespace entries within LeP4. However, the namespace entries within LeP3 are all in orders lower than the namespace entries within LeP1 and LeP2. In other words, all the namespace entries of the leaf pages of the leaf page layer 308 are ordered from the highest to the lowest according to their keys. The numbering of LeP and KDP in FIG. 3A with numerical orders indicates the orders of the leaf pages and key pages.

A benefit of B+ tree to store the namespaces of file systems of a storage system is efficient search time. For example, to search a data in one million <key, data> pairs, a balanced binary tree requires about 20 block reads, while a B+ tree requires only about 4 block reads.

Namespace entries and key page entries associated with file systems are updated during operations of the storage system. The updates are not in a predetermined order and depend on the nature of operations. For example, when a directory grows to contain a large number of files and then subsequently removes a substantial portion of the files, the operations generate leaf pages that are substantially full initially and then become sparse or even empty when the files are removed. When a leaf page becomes empty, it will be collected and reused. However, a sparse page can't be simply collected as it still contain valid namespace entries, thus it may be left in the sparse state.

FIG. 3A illustrates dense leaf pages with shadowed boxes while the sparse leaf page with clean boxes. As illustrated, leaf pages LeP6 and LeP7 are sparse while other leaf pages are dense. The definition of dense and sparse depends on implementation. In one embodiment, when a leaf page is over 50% occupied by namespace entries, the leaf page is considered dense, otherwise the leaf page is considered sparse. For example, when leaf pages are set to be fixed to be 64 KB in size, a leaf page is sparse when only 32 KB or less are occupied. Note a threshold other than 50% may be used to determine a leaf page being sparse or not, depending on implementation.

It is disadvantageous to have a B+ tree of file system namespace containing a large number of sparse leaf pages. For example:

Storage space is wasted. A leaf page remains sparse until new namespace entries are created in the leaf page. New namespace entries are created when files/directories corresponding to the same parent key pages are created. When that does not happen, the leaf page may stay sparse for a long period of time and it wastes storage space of namespace of the storage system.

Performance is degraded. A B+ tree with significant number of sparse leaf page will degrade the file system namespace performance for two reasons:

Each sparse leaf page contains less valid information, and one may have to read more pages to collect the needed information;

Reading more sparse pages will cause cache churn of a directory manager interacting with the file system namespace.

Thus, it is desirable to compress file system namespace and reduce sparse leaf pages of the B+ tree. One approach is to create a snapshot of the B+ tree, and then compress the B+ tree based on the snapshot. The problem is that creating a snapshot is expensive: All input/output (I/O) of to the namespace need to be blocked, which means significant system wide contention. Also, the active B+ tree stays fragmented until it is swapped with the compressed snapshot. With snapshotting being expensive, a storage system cannot perform such operations frequently (for example, once every week or so), thus the active B+ tree may stay fragmented for a long period of time. Yet, often the B+ tree of a file system namespace of a storage system may become fragmented over a short period of time, thus, the snapshot based approach has its limitation, and it is desirable to find a more flexible compression method for a file system namespace of a storage system.

When deletion operation happens on a file system of a storage system, it may potentially create a new sparse leaf page in the B+ tree of the file system namespace of the storage system. According one embodiment of the invention, a compression thread (e.g., a garbage collector) will merge the new sparse leaf page with an immediate adjacent leaf page if possible. The merging is possible when the immediate adjacent leaf page is next to the sparse leaf page and also shares the same parent key page. Merging the leaf pages having the same parent key page means co-locating the files under the same directory; this guarantees a better namespace locality. Moreover, examining the parent inode containing an intermediate key may let the compression thread decide how the adjacent leaf page should be merged. For example, given pages LeP0, LeP1, and LeP2 are adjacent leaf pages, if these pages have different parent inode, the compression thread will do the merging solely based on the capacities; if these pages share the same parent inode, the compression thread may merge LeP0 and LeP1 to a full page (e.g., new LeP0). Then a new files created in the parent directory will only append to LeP2, without touching the new LeP0.

As merging leaf pages requires write lock these leaf pages, the compression thread only do the compression when the system activity level below a certain threshold (e.g., the system ingest rate is below a predetermined value). The compression thread may be invoked periodically (e.g., every thirty seconds). At each run, the compression thread checks the system activity level. If the system activity level is above the certain threshold, the compression thread does not run; if the system activity level is below the certain threshold but above another idleness threshold, the compression thread processes the sparse leaf pages slowly (e.g., through an automatic throttling mechanism); and if the system activity level is below the idleness threshold, the compression thread processes the sparse leaf pages at full speed.

Figure 4A:
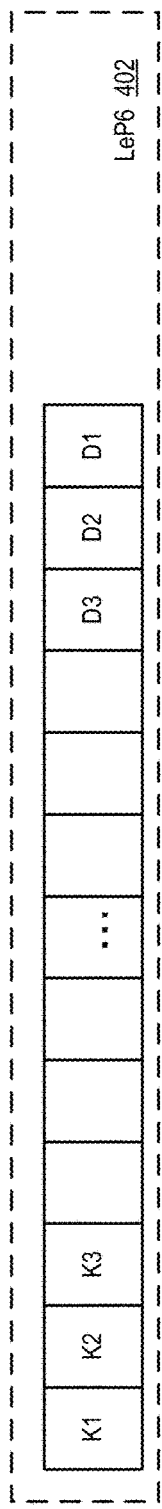
FIGS. 4A-B illustrate different formations of leaf pages of a hierarchical data structure according to one embodiment of the invention.
Figure 4B:
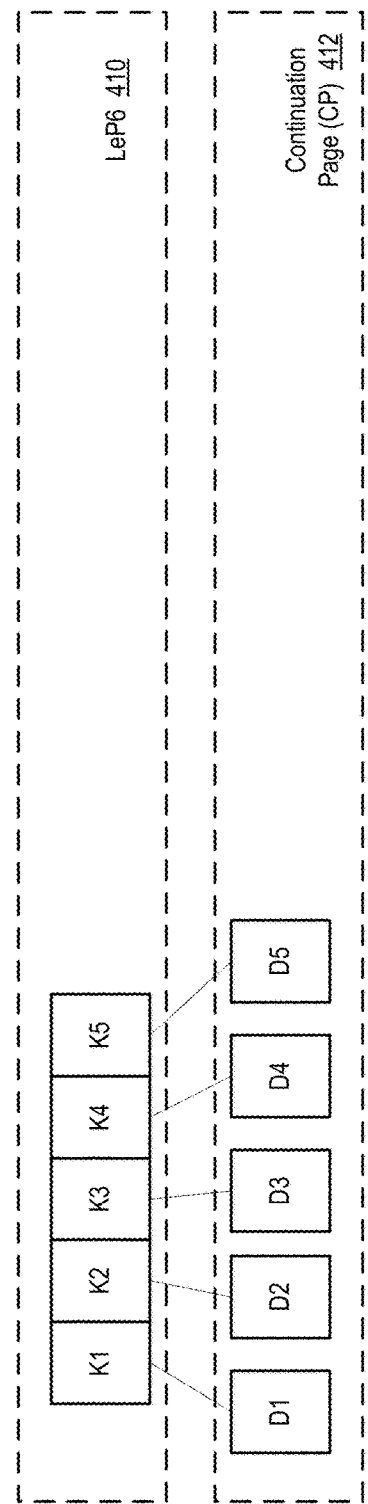

FIGS. 4A-B illustrate different formations of leaf pages of a hierarchical data structure according to one embodiment of the invention. The hierarchical data structure stores file system namespace of a storage system. As discussed herein above, a leaf page contains entries of <key, data> pairs.

FIG. 4A illustrates one arrangement of a leaf page, where keys are stored in a sorted order from one end of the leaf page (LeP6 of FIG. 3A). The corresponding data of the <key, data> pairs are stored in the same sorted order from the other end of the leaf page. The separation of keys and data may speed up searching of the B+ tree.

FIG. 4B illustrates another arrangement of a leaf page. The leaf page (LeP6 of FIG. 3A) contains a continuation page so that the leaf page may store more <key, data> pairs. In this leaf page, keys are stored in one page and the corresponding data are stored in another page. Both the keys and data are stored in a sorted order.

In one embodiment, each leaf page and continuation is of a fixed size (e.g., 64 KB). A hierarchical data structure may contain both leaf pages with continuation pages and leaf pages without continuation pages. A leaf page with a continuation page may be adjacent to a leaf page without a continuation page.

FIGS. 5A-B illustrate leaf page merging of a hierarchical data structure according to one embodiment of the invention. The key pages and leaf pages are similar to the key pages and leaf pages of FIG. 3A. Referring to FIG. 5A, key page 502 is the parent page pointing to leaf pages LeP5-7. Leaf pages LeP5-7 are the child pages of key page 502, and they share the same parent page and thus they are neighboring leaf pages. All neighboring pages of a same parent page may form a leaf page neighborhood, and only leaf page within a same leaf page neighborhood may be merged.

In merging operation, after determining a leaf page is sparse (e.g., LeP6), it examines its immediate adjacent pages at its left and right. In this example, it determines that the size of a combined of the left immediate adjacent leaf page LeP5 and LeP6 will be less than a full page, thus they can be merged. For example, being sparse means the size of a leaf page is less than approximately 50%. Assuming both the sizes of leaf pages LeP5 and LeP6 are less than 50%, the combination of leaf pages LeP5 and LeP6 will be less than 100%. They can be merged without modifying the parent key page 502 as they are neighboring pages sharing the same parent page. Thus, a merge will be performed. After the merge, LeP5 will become empty, and it will be collected and reused later.

Similarly in FIG. 5B, after determining the leaf page LeP6 is sparse, it determines that the size of a combined of the right immediate adjacent leaf page LeP7 and LeP6 will be less than a full page, thus a merge between LeP6 and LeP7 will be performed. After the merge, LeP7 will become empty, and it will be collected and reused later.

Note merging can be repeated if a resulting leaf page is still sparse after a merge. For example, if after merging LeP7, the updated LeP6 is still sparse, it will then determine whether the size of a combined of the left immediate adjacent leaf page LeP5 (even though it is determined to be dense) and LeP6 will be less than a full page, if the resulting combined leaf page is less than a full page, it will merge LeP5 into LeP6. That is, the state of being sparse or dense may be immaterial in making the merge decision, as long as the combined leaf page is less than a threshold size (e.g., the size of a full page).

Figure 6A:
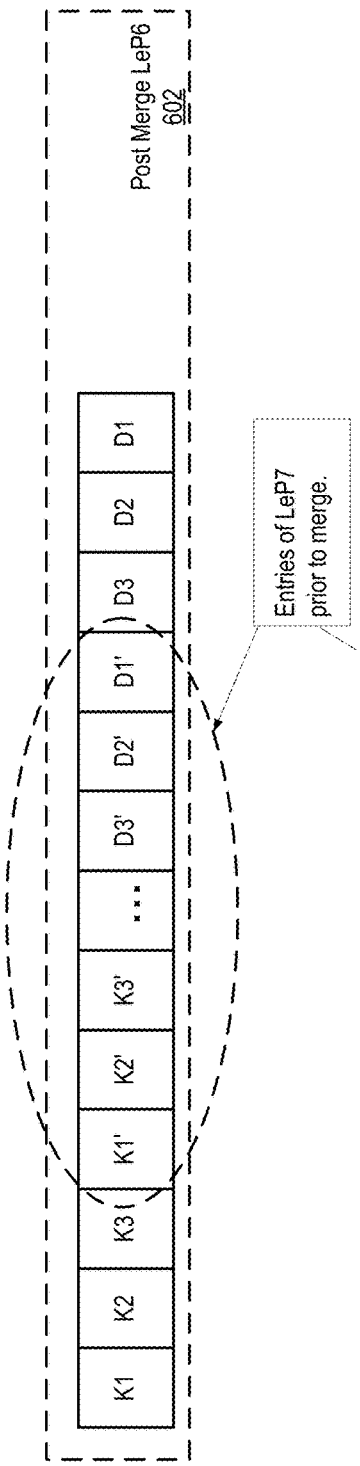
FIG. 6A-B illustrate different formations of leaf pages of a hierarchical data structure after merging according to one embodiment of the invention.
Figure 6B:
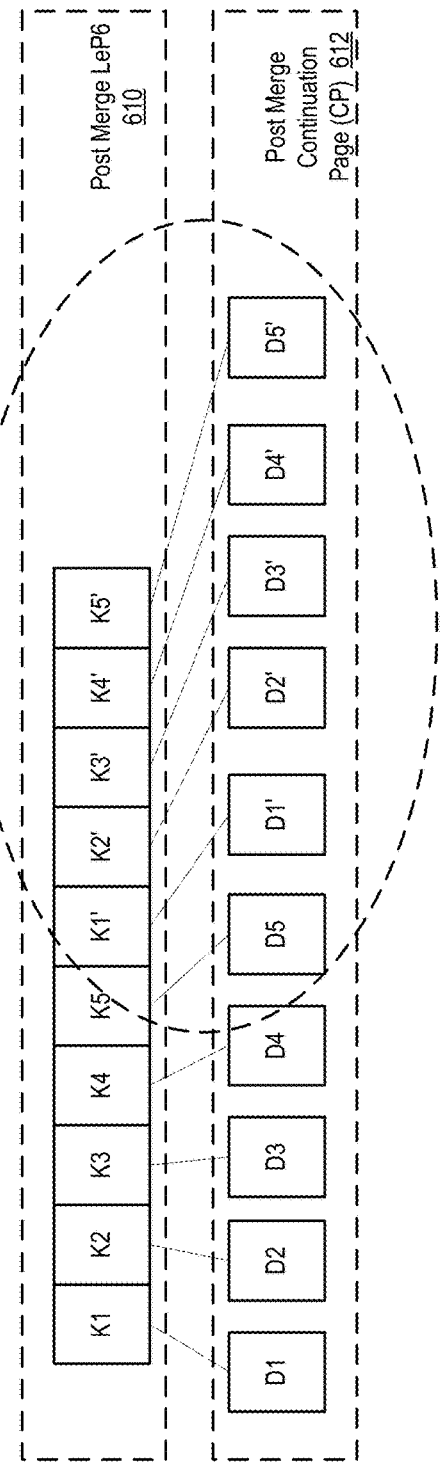

FIG. 6A-B illustrate different formations of leaf pages of a hierarchical data structure after merging according to one embodiment of the invention. The figures assumes that entries of LeP7 are merged into LeP6. FIG. 6A illustrates the post merge LeP6 when both leaf pages LeP6 and LeP7 do not contain continuation page. In that case, since entries of LeP7 are in the sorting order lower than that of LeP6, the keys of LeP7 (K1'-K3' as example) are inserted after the keys of LeP6 (K1-K3 as example) at one end of the leaf page. Similarly, the data of LeP7 (D1'-D3' as example) are inserted after the data of LeP6 (D1-D3 as example) at the other end of the leaf page.

FIG. 6B illustrates the post merge LeP6 when at least one of leaf pages LeP6 and LeP7 contain a continuation page (LeP6 containing a continuation page in the example). In that case, the keys of both leaf pages are combined into the key page of LeP6 in order of the keys, where K1-K5 of original LeP6 are in higher orders of K1'-K5' of original LeP7, and where the ordered data are pointed by the ordered keys.

Figure 7:
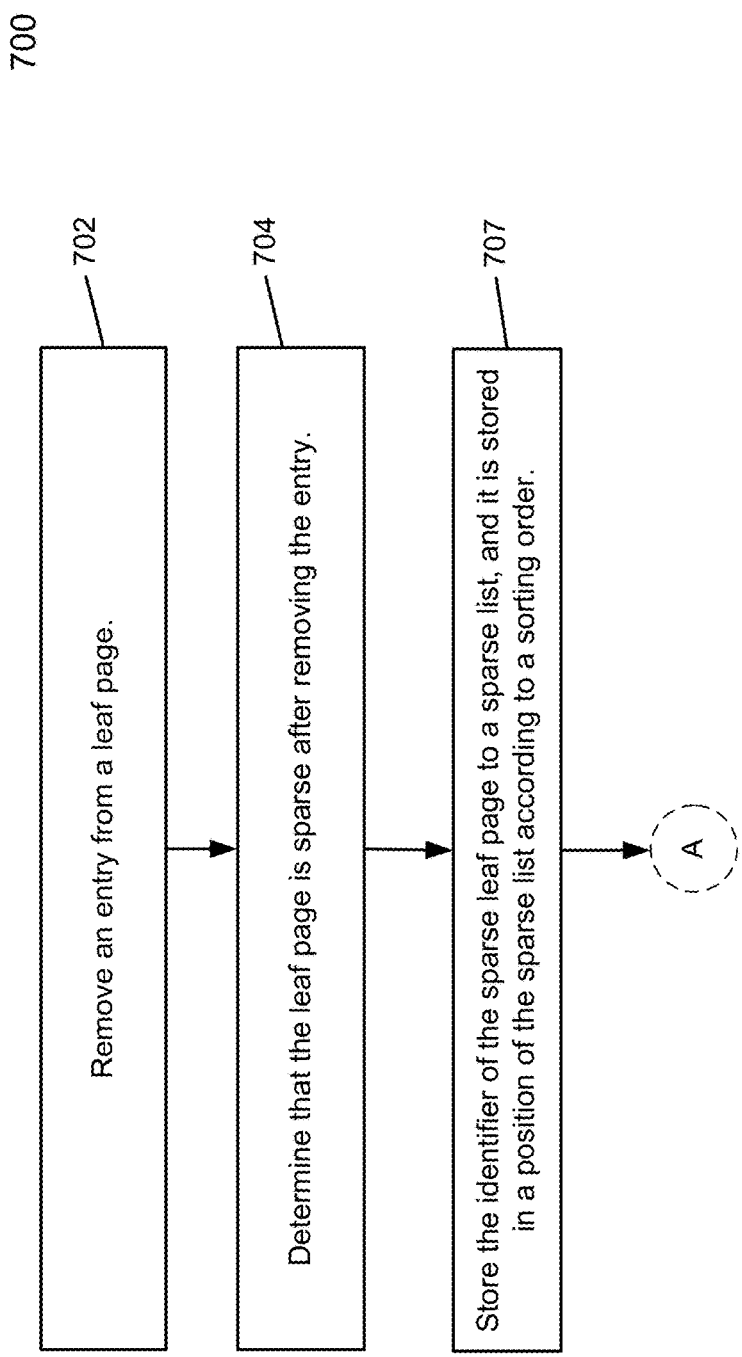
FIG. 7 is a flow diagram illustrating a method of identifying sparse leaf pages using a sparse list according to one embodiment of the invention.

As discussed herein, the compression (the merging operations) may be performed periodically. It is desirable to determine which leaf pages are to compress beforehand so that the compression does not need to pick out those leaf pages at the time of compression. FIG. 7 is a flow diagram illustrating a method of identifying sparse leaf pages using a sparse list according to one embodiment of the invention. Method 700 may be performed on a storage system, and it may perform the operations by deduplicated storage engine 201, particularly namespace compressor 250 as illustrated in FIG. 2 in one embodiment.

At reference 702, an entry of a leaf page of a hierarchical data structure of a namespace of a file system is removed. The removal is triggered by a file system operation, and the removed entry may correspond to a file or a directory of the file system. At reference 704, it is determined that the leaf page is sparse after removing the entry. Being sparse may be defined as the entries of the leaf page takes less than a predetermined percentage of size of the leaf page (e.g., approximately 50%) and the remaining space of the leaf page does not contain valid information.

At reference 707, the identifier (e.g., the page number) of the determined sparse leaf page is stored in a sparse list, and it is stored in a position of the sparse list according to a sorting order. The sparse list may be stored for all sparse leaf pages of a file system, and it may also be stored for all sparse pages of all file systems of the storage system. In an alternate embodiment, the determined sparse leaf page itself is stored in the sparse list.

Method 700 may be performed anytime that an entry is removed, and the resulting sparse list is sorted for easier process. FIG. 8 illustrates a sparse list according to one embodiment of the invention. In the sparse list, each entry corresponds to a sparse leaf page of a hierarchical data structure of a namespace of a file system. While each entry is illustrated with an index item, it is not necessary in some embodiments. Each entry contains a parent page number and a leaf page number. The parent page is a key page that points to the leaf page of the hierarchical data structure. The entries of the sparse list are sorted first by the parent page number, and then sorted by the leaf page number.

As discussed herein, the determining of a leaf page being sparse may occur when an entry is removed from a leaf page, thus the sparse list is updated at or near run-time of a storage system.

Figure 9:
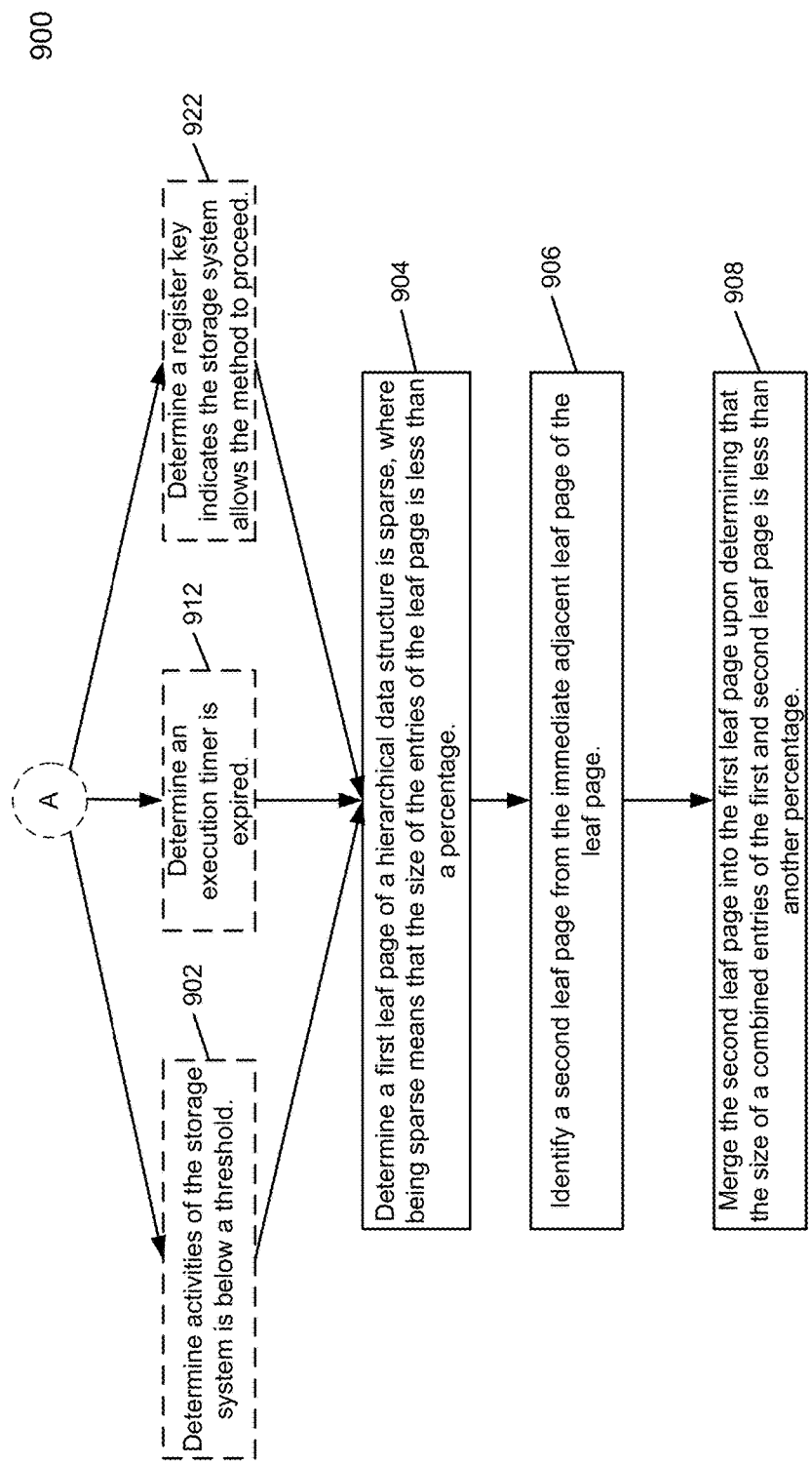
FIG. 9 is a flow diagram illustrates a method for compressing file system namespace of a storage system according to one embodiment of the invention.

FIG. 9 is a flow diagram illustrates a method for compressing file system namespace of a storage system according to one embodiment of the invention. Method 900 may be performed by a storage system such as source storage 104 and target storage 110 of FIG. 1, particularly the namespace compressor 250 within directory manager 222 of FIG. 2. The operations are performed on a leaf page of a hierarchical data structure, where the hierarchical data structure contains a layer of one or more root nodes, a layer of one or more intermediate nodes, and a layer of a number of leaf pages. Each leaf page contains one or more entries and each entry is a namespace entry corresponding to a file or a directory of a file system of the storage system. In one embodiment, the layered data structure is a B+ tree data structure, and each intermediate node is an internal node of the B+ tree, and each internal node is a parent page of one or more leaf pages.

Method 900 optionally may start at cycle A, which is the same cycle A at the end of FIG. 7. That is, method 900 may optionally start with a sparse list, so the leaf page (the first leaf page at reference 904) examined in method 900 is within the sparse list.

Additionally, method 900 may determine that activities of the storage system is below a threshold at reference 902. That is, if the activities of the storage system is above a threshold, method 900 stops, and it only continues and execute operations in references 904-908 if the activities of the storage system is below the threshold.

Additionally, method 900 may determine that an execution timer is expired at reference 912 before it continues operations in references 904-908, and if the execution timer is still counting, method 900 stays at reference 912. Similarly, method 900 may determine that a register key indicates that the storage system allows the method to proceed at reference 922 before it continues operations in references 904-908, and if the register key indicates otherwise, method 900 stays at reference 922.

Operations prior to cycle A, and references 902, 912, and 922 are optional steps to make the compression method operate more efficiently, and they can be operated separately or in combination in various embodiments of the invention, but they are not necessary in every embodiment.

At reference 904, it is determined that a first leaf page is sparse (when the sparse list is used, the first leaf page is stored as an entry of the sparse list) by a namespace compressor. Being sparse means the size of the entries of the first leaf page is less than a first percentage of a predetermined size. In one embodiment, the predetermined size is the full size in KB of the leaf pages (e.g., 64 KB), and the first percentage is approximately 50%. The step confirms that the leaf page is sparse, even if it's stored in a sparse list.

At reference 906, the namespace compressor identifies a second leaf page from the number of leaf pages as a merging candidate, where the second leaf page is an immediate adjacent leaf page of the first leaf page. The second leaf page is the immediate adjacent leaf page of the first leaf page either at its left or right. As the leaf pages are sorted in order, and they share the same parent page, they may be merged.

At reference 908, the namespace compressor merge the second leaf page into the first leaf page upon determining that a second size of combined entries of the first leaf page and the second leaf page is less than a second percentage of the predetermined size, where the second percentage is larger than the first percentage. In one embodiment, the second percentage is approximately 100%.

Figure 10:
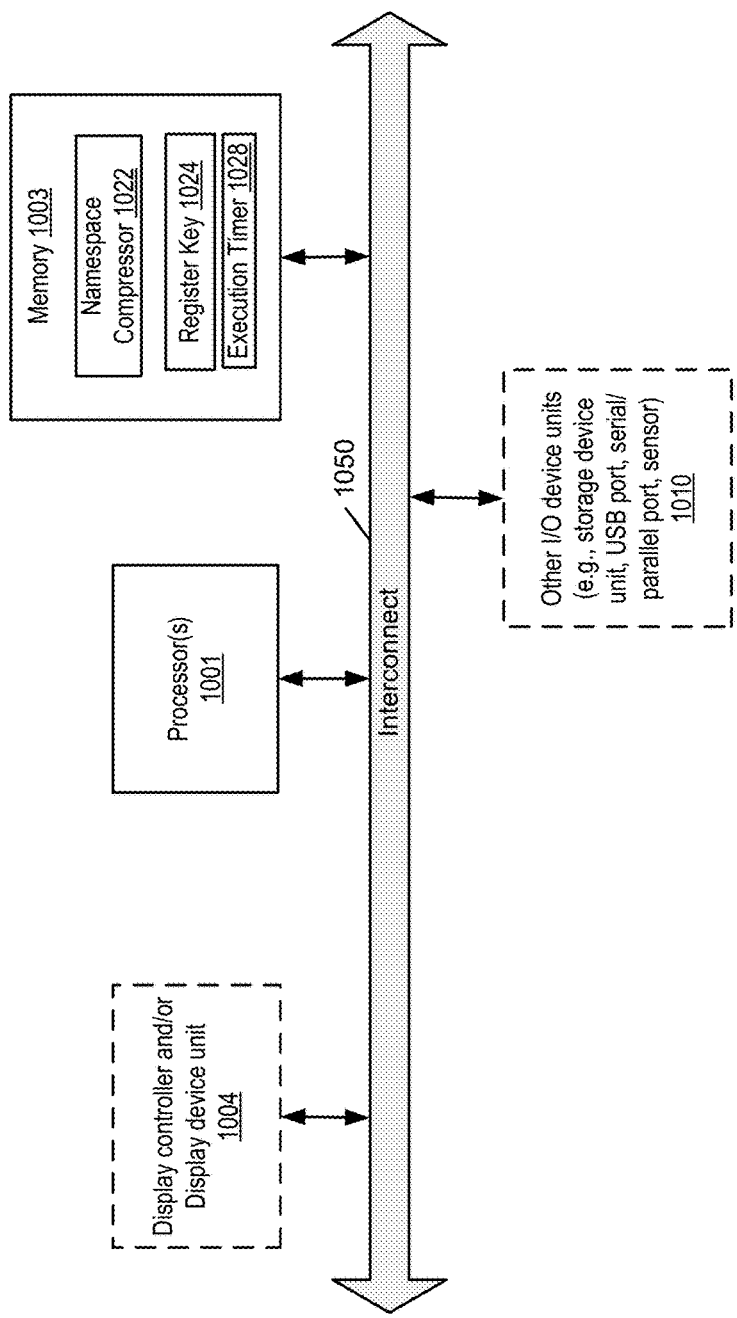
FIG. 10 is a block diagram illustrating a storage system that may be used with one embodiment of the invention.

FIG. 10 is a block diagram illustrating a storage system that may be used with one embodiment of the invention. For example, system 100 may represent any of the storage system described above performing any of the processes or methods described above. System 1000 can include many different components, where optional components are illustrated with dotted boxes. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that system 1000 is intended to show a high level view of many components of the computing system. However, it is to be understood that additional components may be present in certain implementations and furthermore, different arrangement of the components shown may occur in other implementations.

In one embodiment, system 1000 includes processor 1001, memory 1003, and device units 1004-1010 that are interconnected via a bus or an interconnect 1050. Processor 1001 may represent a single processor or multiple processors with a single processor core or multiple processor cores included therein. Processor 1001 may represent one or more general-purpose processors such as a microprocessor, a central processing unit (CPU), or processing device. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001 may communicate with memory 1003, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 1001 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device units. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

In one embodiment, processor 1001 of system 1000 is configured to execute data and instructions stored in memory 1003. The data and instructions include namespace compressor 1022, register key 1024, and timer 1028.

In one embodiment, namespace compressor 1022 performs operations discussed in references 904-908 of FIG. 9 after determining that register key 1024 indicates that the compression is allowed to proceed, or after execution timer 1028 expires.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method performed by a storage system, comprising:
   determining, by a namespace compressor of a directory manager of a file system executed by one or more processors of the storage system, that a first leaf page of a hierarchical data structure of the storage system is sparse, wherein the hierarchical data structure contains a layer of one or more root nodes, a layer of one or more intermediate nodes, and a layer of a plurality of leaf pages, wherein each leaf page is associated with a continuation page and with (key, data) pairs, wherein the keys are stored in the leaf page and corresponding data is stored in the continuation page, the data including one or more entries and each entry is a namespace entry corresponding to a file or a directory of a file system of the storage system, and wherein determining that the first leaf page is sparse includes
    monitoring removal operations within the file system of the storage system, and
    in response to the storage system removing a file or a directory of the file system corresponding to a first namespace entry stored in the continuation page of the first leaf page, determining a first size of remaining entries of the first leaf page is less than a first percentage of a predetermined size;
identifying, by the namespace compressor, a second leaf page from the plurality of leaf pages as a merging candidate based on a second size of combined entries of the first leaf page and the second leaf page being less than a second percentage of the predetermined size, wherein the second percentage is larger than the first percentage, and wherein the second leaf page is an immediate adjacent leaf page of the first leaf page; and
in response to determining a write lock for leaf pages is available based on a system activity level of the storage system falling below a threshold, merging by the namespace compressor the keys of the second leaf page into the keys of the first leaf page and the entries of a continuation page associated with the second leaf page into the entries of a continuation page associated with the first leaf page.

2. The computer-implemented method of claim 1, wherein the layered data structure is a B+ tree data structure, and each intermediate node is an internal node of the B+ tree, and each internal node is a parent page of one or more leaf pages.

3. The computer-implemented method of claim 1, wherein an identifier of the first leaf page is in a sparse list of the file system, and wherein the identifier of the first leaf page enters the sparse list through:
    removing an entry from the first leaf page;
    determining that the first leaf page is sparse after removing the entry; and
    storing the identifier of the first leaf page to the sparse list of the file system, wherein the identifier of the first leaf page is stored in a position of the sparse list according to a sorting order.

4. The computer-implemented method of claim 1, further comprising:
    prior to determining that a first leaf page of the hierarchical data structure is sparse, determining that activities of the storage system is below a threshold.

5. The computer-implement method of claim 1, further comprising:
    prior to determining that a first leaf page of the hierarchical data structure is sparse, determining that a register key of the storage system indicates that the storage system allows the method to proceed.

6. The computer-implemented method of claim 1, further comprising:
    prior to determining that a first leaf page of the hierarchical data structure is sparse, determining an execution timer is expired.

7. The computer-implemented method of claim 1, wherein the first percentage is approximately 50%, and wherein the second percentage is approximately 100%.

8. The computer-implemented method of claim 1, wherein the storage system is a deduplicated storage system.

9. A storage system, comprising:
    a memory configured to store data and instructions; and
    a processor configured to execute a namespace compressor stored in the memory,
    the namespace compressor configured to
    determine that a first leaf page of a hierarchical data structure is sparse, wherein the hierarchical data structure contains a layer of one or more root nodes, a layer of one or more intermediate nodes, and a layer of a plurality of leaf pages, wherein each leaf page is associated with a continuation page and with (key, data) pairs, wherein the keys are stored in the leaf page and corresponding data is stored in the continuation page, the data including one or more entries and each entry is a namespace entry corresponding to a file or a directory of a file system of a storage system, and wherein determining that the first leaf page is sparse includes
    monitoring removal operations within the file system of the storage system, and
    in response to the storage system removing a file or a directory of the file system corresponding to a first namespace entry stored in the continuation page of the first leaf page, determining a first size of remaining entries of the first leaf page is less than a first percentage of a predetermined size;
    identify a second leaf page from the plurality of leaf pages as a merging candidate based on a second size of combined entries of the first leaf page and the second leaf page being less than a second percentage of the predetermined size, wherein the second percentage is larger than the first percentage, and wherein the second leaf page is an immediate adjacent leaf page of the first leaf page; and
    in response to a determination that a write lock for leaf pages is available based on a system activity level of the storage system falling below a threshold, merge the keys of the second leaf page into the keys of the first leaf page and the entries of a continuation page associated with the second leaf page into the entries of a continuation page associated with the first leaf page.

10. The storage system of claim 9, wherein the layered data structure is a B+ tree data structure, and each intermediate node is an internal node of the B+ tree, and each internal node is a parent page of one or more leaf pages.

11. The storage system of claim 9, wherein the namespace compressor configured to:
    remove an entry from the first leaf page;
    determine that the first leaf page is sparse after removing the entry; and
    store the first leaf page to a sparse list of the file system, wherein the first leaf page is stored in a position of the sparse list according to a sorting order.

12. The storage system of claim 9, further comprising a register key, wherein the namespace compressor checks whether the register key indicates the namespace compressor may perform the other operations.

13. The storage system of claim 9, further comprising an execution timer, wherein the namespace compressor checks whether the execution timer is expired prior to performing the other operations.

14. The storage system of claim 9, wherein the first percentage is approximately 50%, and wherein the second percentage is approximately 100%.

15. The storage system of claim 9, wherein the storage system is a deduplicated storage system.

16. A non-transitory computer-readable medium having instructions stored therein, which when executed by a processor, cause the processor to perform operations, the operations comprising:

determining that a first leaf page of a hierarchical data structure is sparse, wherein the hierarchical data structure contains a layer of one or more root nodes, a layer of one or more intermediate nodes, and a layer of a plurality of leaf pages, wherein each leaf page is associated with a continuation page and with (key, data) pairs, wherein the keys are stored in the leaf page and corresponding data is stored in the continuation page, the data including one or more entries and each entry is a namespace entry corresponding to a file or a directory of a file system of a storage system, and wherein determining that the first leaf page is sparse includes monitoring removal operations within the file system of the storage system, and in response to the storage system removing a file or a directory of the file system corresponding to a first namespace entry stored in the continuation page of the first leaf page, determining a first size of remaining entries of the first leaf page is less than a first percentage of a predetermined size;

identifying a second leaf page from the plurality of leaf pages as a merging candidate based on a second size of combined entries of the first leaf page and the second leaf page being less than a second percentage of the predetermined size, wherein the second percentage is larger than the first percentage, and wherein the second leaf page is an immediate adjacent leaf page of the first leaf page; and in response to determining a write lock for leaf pages is available based on a system activity level of the storage system falling below a threshold, merging the keys of the second leaf page into the keys of the first leaf page and the entries of a continuation page associated with the second leaf page into the entries of a continuation page associated with the first leaf page.

17. The non-transitory computer-readable medium of claim 16, wherein the layered data structure is a B+ tree data structure, and each intermediate node is an internal node of the B+ tree, and each internal node is a parent page of one or more leaf pages.

18. The non-transitory computer-readable medium of claim 16, wherein an identifier of the first leaf page is in a sparse list of the file system, and wherein the identifier of the first leaf page enters the sparse list through:

removing an entry from the first leaf page;

determining that the first leaf page is sparse after removing the entry; and storing the identifier of the first leaf page to the sparse list of the file system, wherein the identifier of the first leaf page is stored in a position of the sparse list according to a sorting order.

19. The non-transitory computer-readable medium of claim 16, wherein the first percentage is approximately 50%, and wherein the second percentage is approximately 100%.

\* \* \* \* \*